United States Patent [19]
Nii

[11] Patent Number: 5,650,931
[45] Date of Patent: Jul. 22, 1997

[54] GENERATOR OUTPUT CONTROLLER FOR ELECTRIC VEHICLE WITH MOUNTED GENERATOR

[75] Inventor: Yoshihide Nii, Fuji, Japan

[73] Assignee: Toyota Jidosha Kabushiki Kaisha, Toyota, Japan

[21] Appl. No.: 389,810

[22] Filed: Feb. 16, 1995

[30] Foreign Application Priority Data

Feb. 21, 1994 [JP] Japan .................................. 6-022371

[51] Int. Cl.$^6$ .................................. B60L 11/02
[52] U.S. Cl. .................................. 364/424.026; 318/139; 180/65.4
[58] Field of Search .................. 364/423.098, 424.026; 180/65.1, 65.2, 65.3, 65.4; 318/139; 290/14, 16, 17

[56] References Cited

U.S. PATENT DOCUMENTS

| | | | |
|---|---|---|---|
| 5,176,213 | 1/1993 | Kawai et al. | 180/65.4 |
| 5,280,223 | 1/1994 | Grabowski et al. | 318/139 |
| 5,318,142 | 6/1994 | Bates et al. | 180/65.2 |
| 5,359,308 | 10/1994 | Sun et al. | 180/65.3 |
| 5,461,289 | 10/1995 | Adler et al. | 318/139 |
| 5,492,190 | 2/1996 | Yoshida | 180/65.4 |

FOREIGN PATENT DOCUMENTS

| | | |
|---|---|---|
| 0556942 | 8/1993 | European Pat. Off. |
| 3112629 | 10/1982 | Germany |
| 4000678 | 7/1991 | Germany |
| 4116899 | 11/1991 | Germany |
| 60-74937 | 4/1985 | Japan |
| 62-272803 | 11/1987 | Japan |
| 4-29504 | 1/1992 | Japan |

*Primary Examiner*—Gary Chin
*Attorney, Agent, or Firm*—Oliff & Berridge

[57] ABSTRACT

An output memory unit 26a stores data for the necessary average output of a generator 20 for a pattern obtained from the past in-travel-pattern power consumption. Therefore, in the case of a travel pattern, the output of the generator 20 is set in accordance with the stored data. Moreover, the power consumption in the travel pattern is examined to update the necessary average output of the generator 20.

14 Claims, 5 Drawing Sheets

GENERATOR OUTPUT CONTROLLER FOR ELECTRIC VEHICLE WITH MOUNTED GENERATOR

BACKGROUND OF THE INVENTION

1. Field of the Invention

The present invention relates to a generator output controller for an electric vehicle having a generator mounted in addition to a battery.

2. Description of the Prior Art

An electric vehicle traveling by driving a motor is already known, which is advantageous in view of low environmental pollution. However, because the electric vehicle drives the motor using electrical power from a mounted battery, the maximum travel distance of the vehicle is limited due to the capacity of the battery. Particularly, because the weight and the size of a battery are limited by the fact that the battery is actually mounted on a vehicle, the capacity cannot be increased very much, so the maximum travel distance cannot be increased very much either. Moreover, because it takes a long time to charge the battery, it cannot be expected for the state of charge of the battery to recover quickly, although gasoline can be fed to a gasoline-fueled vehicle in a short time. Therefore, a hybrid vehicle is proposed whose maximum travel distance is increased by mounting an engine-driven generator on an electric vehicle and it is possible to charge a battery using electrical power obtained from the generator.

Because the hybrid vehicle drives an engine, it produces exhaust gas. However, because the engine is driven to generate electric power, the load fluctuation and the rotational speed fluctuation of the engine are much smaller than those for driving a vehicle and therefore harmful components in exhaust gas can be greatly decreased.

Therefore, a travel distance equal to that of a gasoline-fueled vehicle and a low environmental pollution close to that of an electric vehicle can be obtained from the hybrid vehicle.

To minimize harmful components in the exhaust gas of this type of hybrid vehicle, it is desirable to drive the engine at a constant load and a constant rotational speed so that the power generation is kept at a constant value.

However, the power consumption of an electric vehicle depends on the travel conditions. That is, when the electric vehicle travels on many upward slopes or repeatedly stops and starts because there are many traffic signals, the power consumption increases. Therefore, it is disclosed in Japanese Patent Application Laid-Open No. SHO-60-7437 (1985) (JP-A-60 007 437) that the electric power output of a generator is controlled in accordance with the state of charge of a battery.

However, if the generator output is changed as described above, the engine output must also be fluctuated. Therefore, a problem occurs that harmful components in exhaust gas increase. Moreover, a problem occurs that the operation of an engine in the above way increases fuel consumption.

SUMMARY OF THE INVENTION

It is an object of the present invention to provide a generator output controller for an electric vehicle with a mounted generator, making it possible to effectively obtain a desired amount of power generation For example, power generation is properly controlled by recognizing a predetermined travel pattern by an instruction of the driver or recognizing a travel pattern in accordance with the start time of a vehicle.

The present invention is a generator output controller for a vehicle having a generator mounted in addition to a motor driven by a battery, comprising:

- travel-pattern recognition means for recognizing travel repeated in accordance with a specific pattern;
- an in-travel-pattern power consumption memory unit for storing data for power consumption in a travel pattern; and in-travel-pattern power generation control means for controlling the output of a generator to a power generation equal to the power consumption value in a travel pattern read out of the travel-pattern power consumption memory unit when the travel pattern is recognized by the travel-pattern recognition means.

According to the present invention, the output of a generator is set to a generator output equal to the power consumption value corresponding to the travel pattern in the case of traveling according to a travel pattern. Therefore, it is possible to generate optimum electrical power at a constant value by a generator. Thus, it is possible to decrease harmful components in the exhaust gas of a generator and increase the power consumption of an engine for driving the generator. For example, for a regular travel pattern such as people commuting using a standard vehicle or taking people to and from their offices using a commercial vehicle, it is possible to minimize the power generation Moreover, it is preferable that the travel-pattern recognition means includes travel-pattern start input means and travel-pattern end input means.

Thereby, a travel pattern can be securely recognized through an input by a driver.

Furthermore, it is preferable that the travel-pattern recognition means is provided with:

- in-travel-pattern power consumption detection means for detecting the power consumption of a vehicle in a travel pattern; and
- update means for updating a target power generation stored in the in-travel-pattern power consumption memory unit in accordance with the detected in-travel-pattern power consumption of a vehicle.

In this case, because the optimum generator output is updated in accordance with the travel state after traveling in a travel pattern, the accuracy of generator output is improved as the travel frequency increases.

Moreover, it is preferable that the update means averages the accumulated in-travel-pattern power consumption including a detected in-travel-pattern power consumption and updates a target power generation in accordance with the calculated average value.

As described above, it is possible to set the power generation in a travel pattern to a proper value by averaging the accumulated power consumption when updating a power consumption.

Furthermore, it is preferable that:

- the update means further includes start time detection means for detecting the starting time of a vehicle;
- the in-travel-pattern power consumption memory unit stores the power consumption in a travel pattern by relating it with the start time of the vehicle; and
- the travel-pattern power generation control means controls a generator with the in-travel-pattern power consumption concerned when the starting time of the vehicle is for the travel pattern.

A travel pattern can frequently be determined by the start time of a vehicle. Therefore, by recognizing a travel pattern by the start time of the vehicle, it is possible to recognize the travel pattern and set the power generation of a generator to a proper value even if the driver is not conscious of the travel pattern.

Furthermore, it is preferable that the update means is provided with:

detection means for detecting the power consumption under travel;

duration detection means for detecting the duration of travel of a vehicle; and travel-pattern recognition means for recognizing a travel pattern when a travelling under the same condition is repeated a predetermined number of times or more in accordance with stored data by storing the starting time, power consumption for travel, and duration of travel of a vehicle whenever the vehicle travels.

Thereby, it is possible to accurately obtain the power consumption in a travel pattern.

Moreover, the present invention is a generator output controller for an electric vehicle having a generator mounted in addition to a motor driven by a battery, comprising:

power consumption detection means for detecting the power consumption under travel whenever a vehicle travels;

zone decision means for deciding which zone the detected power consumption is included in among predetermined power consumption zones;

respective-zone usage frequency detection means for counting the frequency of use in each zone, and power generation control means for controlling a generator output to a target generator output corresponding to a power consumption zone with the highest usage frequency in accordance with the result detected by the respective-zone usage frequency detection means.

Therefore, the degree of power consumption under travel is stored for every time of travel, and a power consumption appearing with the highest frequency is used for the generator output at the next time of travel. A travel state having a high frequency in the past may also appear in the future. Thereby, it is possible to set a preferred power generation.

Moreover, it is preferable that the generator output controller is provided with:

state-of-charge detection means for detecting the state of charge of a battery; and correction means for correcting a generator output so as to decrease or increase the generator output in accordance with the detected state of charge when the state of charge is higher than a predetermined upper limit or lower than a predetermined lower limit.

As described above, because power generation is controlled in accordance with the SOC of a battery when the battery SOC goes out of a predetermined range, it is possible to prevent the situation where a vehicle cannot travel due to an insufficient battery capacity and to prevent electrical power from being excessively generated.

DESCRIPTION OF THE PREFERRED EMBODIMENTS

Figure 1:
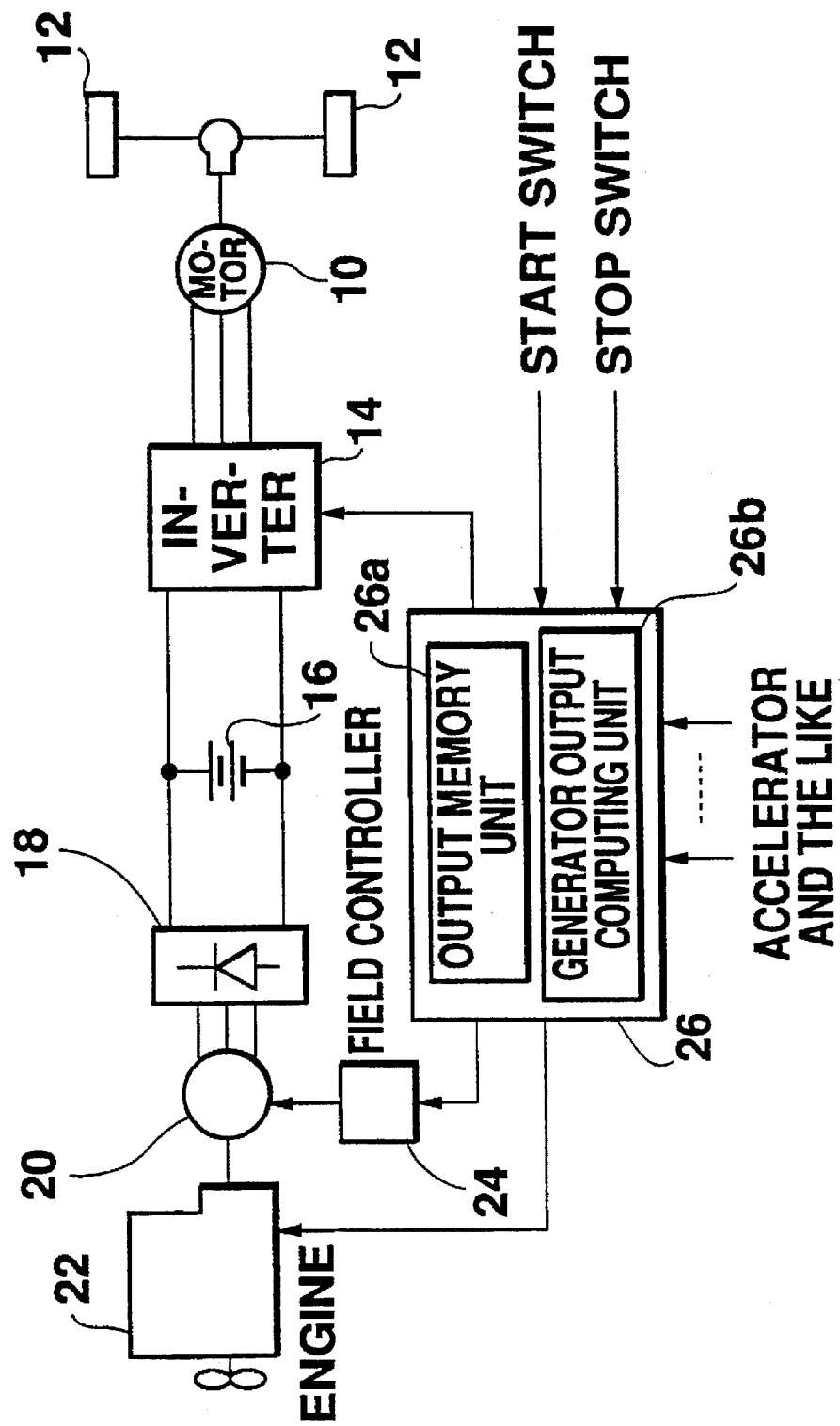
FIG. 1 is a block diagram showing the constitution of an embodiment of the present invention.

Embodiments of the present invention are described below by referring to the accompanying drawings. FIG. 1 is a block diagram showing the overall constitution of the electric vehicle of this embodiment, in which the torque of a motor 10 is transmitted to a tire 12 and thereby a vehicle travels. A battery 16 is connected to the motor 10 through an inverter 14, and DC power sent from the battery 16 is converted to a desired AC power by the inverter 14 and supplied to the motor 10. The motor 10 of this embodiment uses a three-phase induction motor.

A generator 20 is connected to the battery 16 through a rectifier 18. The power generated by the generator 20 is converted to DC power by the rectifier 18 and used to charge the battery 16. The generator 20 is driven by an engine 22. In the case of this embodiment, the engine 22 is a gasoline engine.

Moreover, a field (magnetic field) controller 24 is connected to the generator 20, which controls the field current of the generator 20 and the generator output.

Furthermore, a controller 26 is provided which controls the switching of the inverter 14, rotational speed of the engine 22, and field current generated by the field controller 24. That is, the controller 26 computes an output torque from signals for operating an accelerator and brake, and controls the switching of a power transistor in the inverter 14 to control the output torque of the motor 10.

Moreover, in this embodiment, the controller 26 sets the field current in the field controller 24 and the rotational speed of the engine 22 to desired values. The controller 26 includes an output memory unit 26a and a generator output computing unit 26b.

Figure 2:
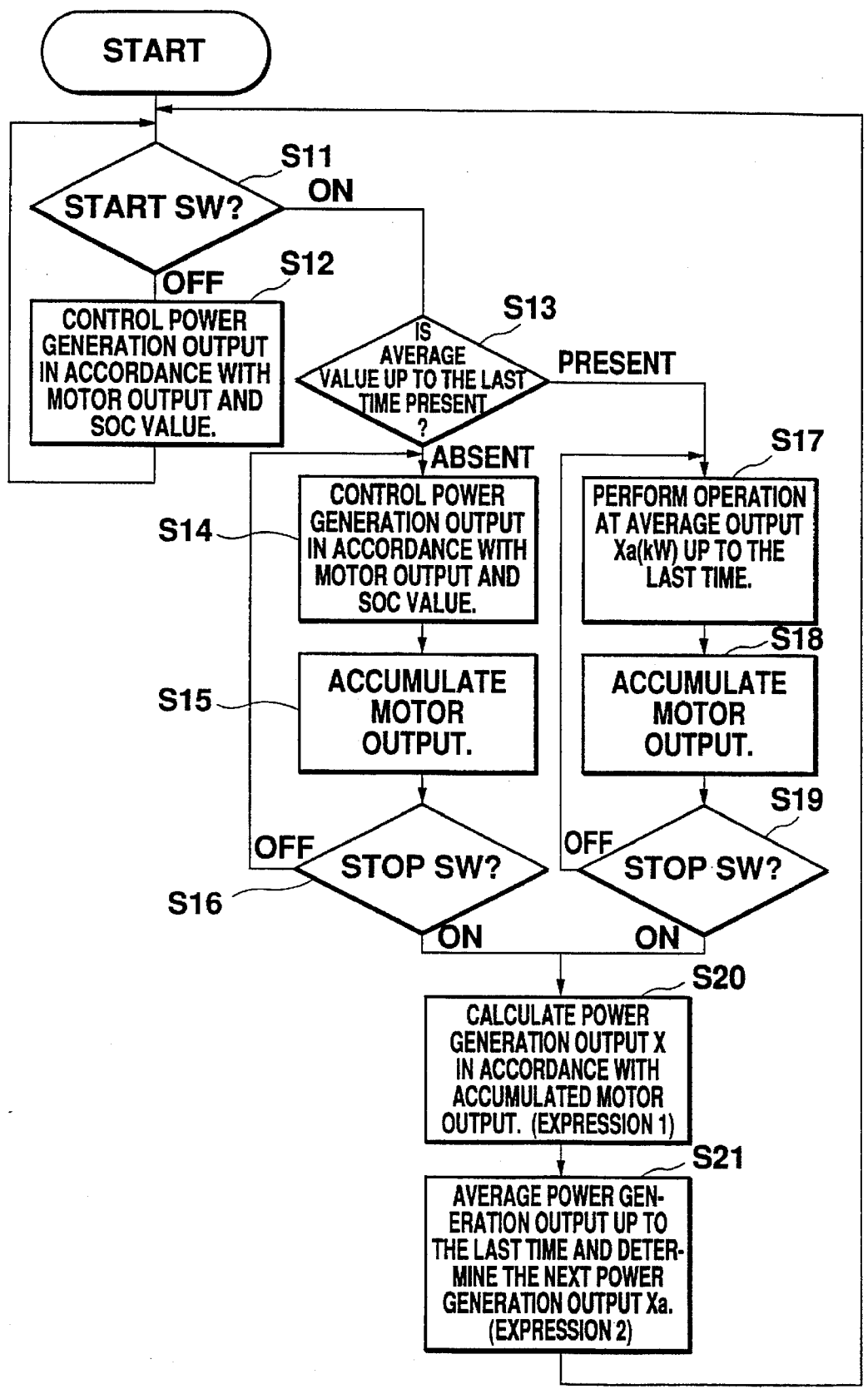
FIG. 2 is a flow chart showing operations of the first embodiment.

Power generation control carried out by the controller 26 of the first embodiment is described below by referring to FIG. 2.

First, it is decided whether a start switch for designating a travel pattern according to this embodiment is ON or OFF (S11). If the switch is OFF, the output of the generator 20 is controlled in accordance with the current output of the motor 10 or the current state of charge (hereafter referred to as SOC) of the battery 16 similarly to the case of a normal hybrid vehicle because a travel pattern is not designated (S12). For example, the generator 20 is operated at a constant power generation when SOC ranges between 70 and 90%, power generation is stopped for an SOC of 90% or more, and power generation is increased for an SOC of 50% or less. Because there is a certain relationship between SOC and motor output, it is also possible to use motor output instead of SOC. Moreover, it is possible to use any technique for the power generation control when under travel.

However, if the start switch is ON in S11, it is decided whether there is the average power consumption up to the last travel pattern (S13). If the pattern average value up to the last time is not found in S13, the output of the motor 10 is controlled and power generation is controlled according to a motor output or SOC value similarly to the case of the above S12 because there is no reference data for power generation control. Thus, the output of the motor 10 on this occasion is accumulated. In this case, the output X of the motor 10 is calculated in accordance with the expression "output of motor 10 X=k×torque command×motor speed".

In the above expression, the motor output is kW, torque command=Nm, and motor speed is rpm. Therefore, "k" is obtained as follows:

$$k = 2\pi/60000 = 1.047 \times 10^{-4}.$$

Then, it is decided whether the stop switch is turned ON (S16). If the switch is OFF, S14 is repeated to repeat travel and accumulation of motor output.

Thereby, the motor output is accumulated until the stop switch is turned OFF after the start switch is turned ON. Then, the accumulated value is stored in the output memory unit 26a as an accumulated motor output for the pattern concerned.

When the average value of power consumption up to the last travel pattern is present in S13, the power generation of the generator 20 is controlled in accordance with the accumulated motor output up to the last travel pattern (SLY). In this control, the controller 26 controls the engine 22 and the field controller 24. Then, the output of the motor 10 under travel is accumulated (S18). Then, the accumulation of the motor output under travel is repeated until the stop switch is turned ON (S19).

When the stop switch is turned ON in S16 or S19, the target generator output x is calculated from the accumulated motor output X by using the following expression because a travel pattern ends.

$$x = X/T \, \eta B \, \eta INV \, \eta M \quad (1)$$

Where,
T: Accumulation time,
$\eta B$: Charge/discharge efficiency
$\eta INV$: Inverter efficiency
$\eta M$: Motor efficiency The power generation for the time corresponding to the motor output (target generator output) is computed in accordance with the above expression. This value is obtained by dividing the accumulated output of the motor 10 by the travel time and also considering the efficiency, that is, the value is obtained by averaging the power consumption of a vehicle under a one-time travel pattern. Moreover, by setting the generator output in a travel pattern to "x", the SOC of the battery 16 does not change before and after the travel pattern if the travel state is the same.

The average value of motor output in a travel pattern travel is calculated by adding the motor output obtained this time to the sum of the motor output up to the last time and dividing the total value by the number of additions and this is used as a new target generator output.

That is, by assuming the accumulated motor output this time as Xn and the accumulated motor output up to the last travel pattern as Xn-1, Xn-2, . . . , the additional value Σx of the target generator output is shown by the following expression.

$$\Sigma x = Xn + Xn-1 + Xn-2, \ldots \quad (2)$$

Therefore, the average value xa which is the new target generator output is shown by the following expression.

$$xa = \Sigma x/n \quad \ldots (3)$$

Thus, the average value xa serves as the new target generator output.

Then, the new target generator output xa is stored in the output memory unit 26a. In the next travel pattern concerned, the output of the generator 20 is controlled so that the output comes to the new target generator output.

As described above, according to this embodiment, a driver turns ON the start switch to notify the controller 26 of the start of a travel pattern in which the same type of travel such as people commuting using a standard vehicle, taking of people to and from their offices using a commercial vehicle, or delivery, is repeated many times. Then, the generator output under a travel pattern until the stop switch is turned OFF after the start switch is turned ON is set to the target generator output obtained from the accumulated output of the motor 10 before the last travel pattern. Because a travel pattern normally consumes approximately the same power, the total power consumption necessary for the travel pattern is approximately equal to the electrical power generated by the generator 20. Therefore, because the generator 20 is operated without load fluctuation, it is possible to decrease harmful components in exhaust gas and improve fuel consumption Moreover, because the accumulated output of the motor 10 in the travel pattern at the time is added to the accumulated data and averaged, the target generator output becomes more accurate as the travel pattern frequency for the same pattern increases.

When the number of target generator outputs to be averaged increases, more storage area is required. Therefore, it is preferable to set an appropriate upper limit (e.g. 10) for the number of target generator outputs to be stored. Moreover, it is possible to obtain a new generator output by storing the storage frequency "n—1" and the average value up to the last time, adding a value obtained by dividing the obtained target generator output by "n—1" to the average value up to the last time, and thereafter multiplying the sum by "n—1/n". Furthermore, it is preferable to set the upper limit of the above "n" to, for example, 10.

The above target generator output is selected so that SOC is held before and after travel. However, in the case of a travel pattern requiring external charge after travel, it is possible to properly set the power generation so that SOC comes to almost 0 after the travel pattern within a range in which travel is possible. Moreover, it is preferable to set a plurality of types of travel pattern so that a pattern can be specified by inputting the ID of the pattern when the start switch is turned ON.

The above target generator output "x" corresponds to the power consumption due to travel. In the case of the above embodiment, the accumulated motor output is stored for each travel pattern. However, it is also possible to store a target generator output corresponding to the accumulated motor output.

Figure 3:
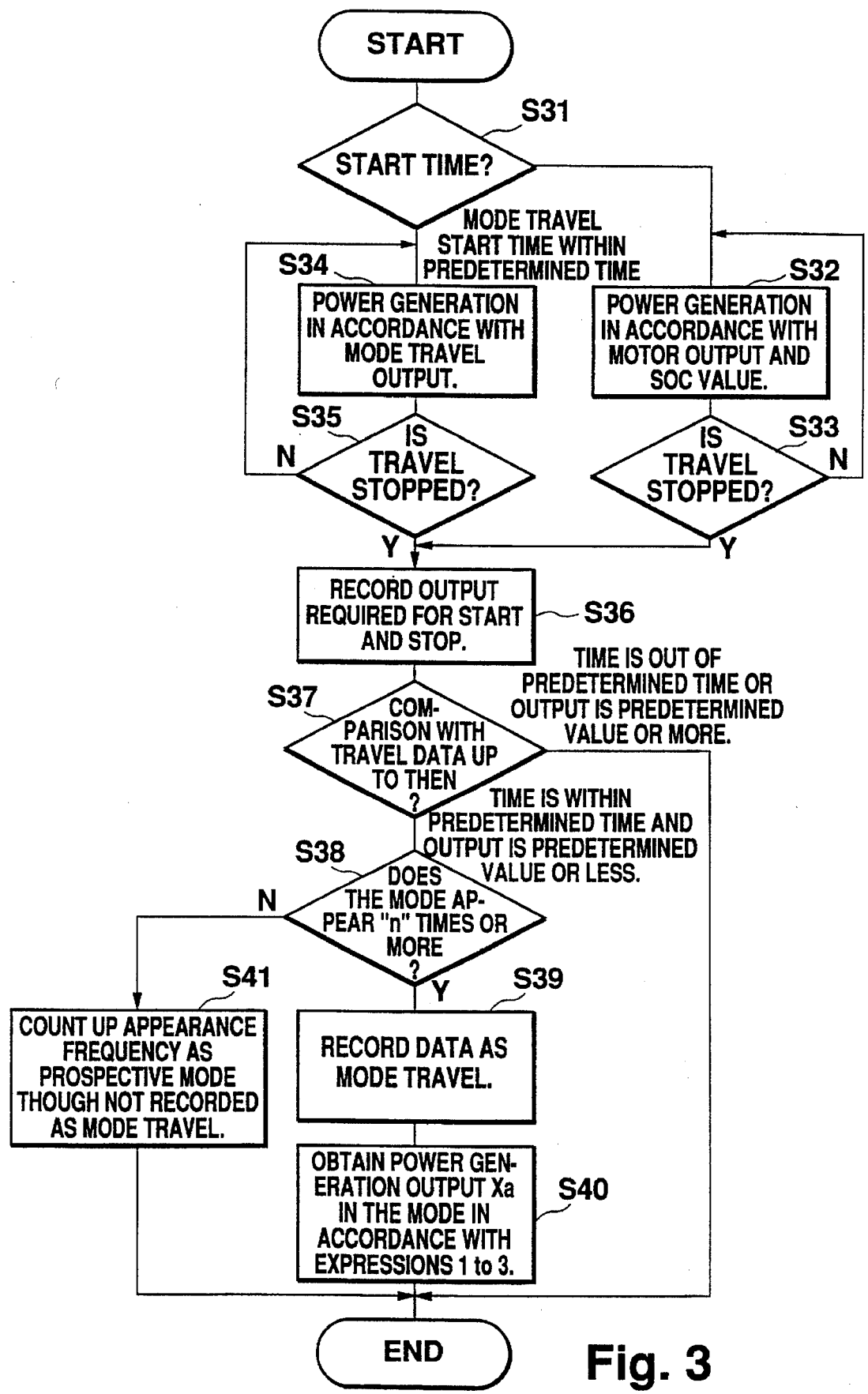
FIG. 3 is a flow chart showing operations of a second embodiment.

FIG. 3 shows the second embodiment. In the case of this embodiment, the starting time and the stopping time of travel of a vehicle are stored while the vehicle travels and the motor output under travel is accumulated. When a journey at the same time and the same accumulated motor output is performed many times, a target generator output is stored by using the journey as a travel pattern. Thereafter, the travel pattern is recognized by the starting time and the output of the generator 20 is automatically set to the target generator output. Therefore, when the target generator output for each pattern is stored as described above, the start time for the travel pattern is also stored.

When travel of a vehicle is prepared by turning ON a power switch, the controller 26 decides whether the time is the starting time for the stored travel pattern (S31). This decision is made not by checking if the time is completely equal to the starting time but by checking if the time is within a certain range. For example, this decision is made by checking if the time is within 30 min before or after the stored starting time. If the time is not contain in the range of the starting time, power generation is controlled in accordance with the output of the motor 10 or SOC value as usual (S32). Then, it is decided whether to stop the travel (S33). When it is decided to continue the travel, S32 is restarted and repeated until the travel is stopped.

Meanwhile, when it is within the range of the starting time in S31, the travel pattern is performed by setting the output of power generator 20 in the stored target generator output (S34). Then, it is decided whether to stop the travel (S35). When it is decided to continue the travel, S34 is restarted and repeated.

However, if it is decided to stop the travel in S33 or S35, the start and stop times in S32 or S34 and the accumulated motor output are recorded (S36). Then, the obtained duration and motor output are compared with the already stored duration and motor output (S37). When both the difference of duration and the difference of motor output data are kept within predetermined values (e.g. 30 min and 1 kWh), it is decided whether the pattern appears "n" times or more (S38).

In S38, when the pattern appears "n" times or more, it is stored as a travel pattern (S39), a target generator output is obtained by the above expressions (1) to (3) (S40), and the target generator output is stored together with the starting time (S39, S40). When the already-stored travel pattern is performed, it is preferable to add the data this time to the target generator output and average the data to make the average value of motor output more accurate, similarly to the above case, and it is also preferable to average start time. It is also possible to calculate the standard deviation of starting time and change the range in S31 in accordance with the standard deviation.

If the pattern appears less than "n" times in S38, the appearance frequency of the pattern is stored as a prospective mode (S41). That is, the counted value is counted up by 1 due to the appearance this time.

According to this embodiment, when a travel with almost the same starting time and travel condition (accumulated motor output) is performed "n" times (e.g. 5 times) or more, the controller automatically regards the travel as a travel pattern and stores the starting time at the target generator output of the travel pattern. When the driving of a vehicle is started at the starting time, a generator output is automatically set to the target generator output.

Therefore, the driver can set the generator output to a desired value without carrying out any operation. However, even if the starting time coincides with the stored travel pattern, the case may not be a travel pattern. Therefore, it is also preferable that a travel pattern is notified to the driver at the start by displaying that the travel pattern is about to be performed and the driver can cancel the travel pattern unless it is desired. Moreover, even when there are a plurality of patterns, it is possible to automatically select a travel pattern in accordance with the starting time.

Figure 4:
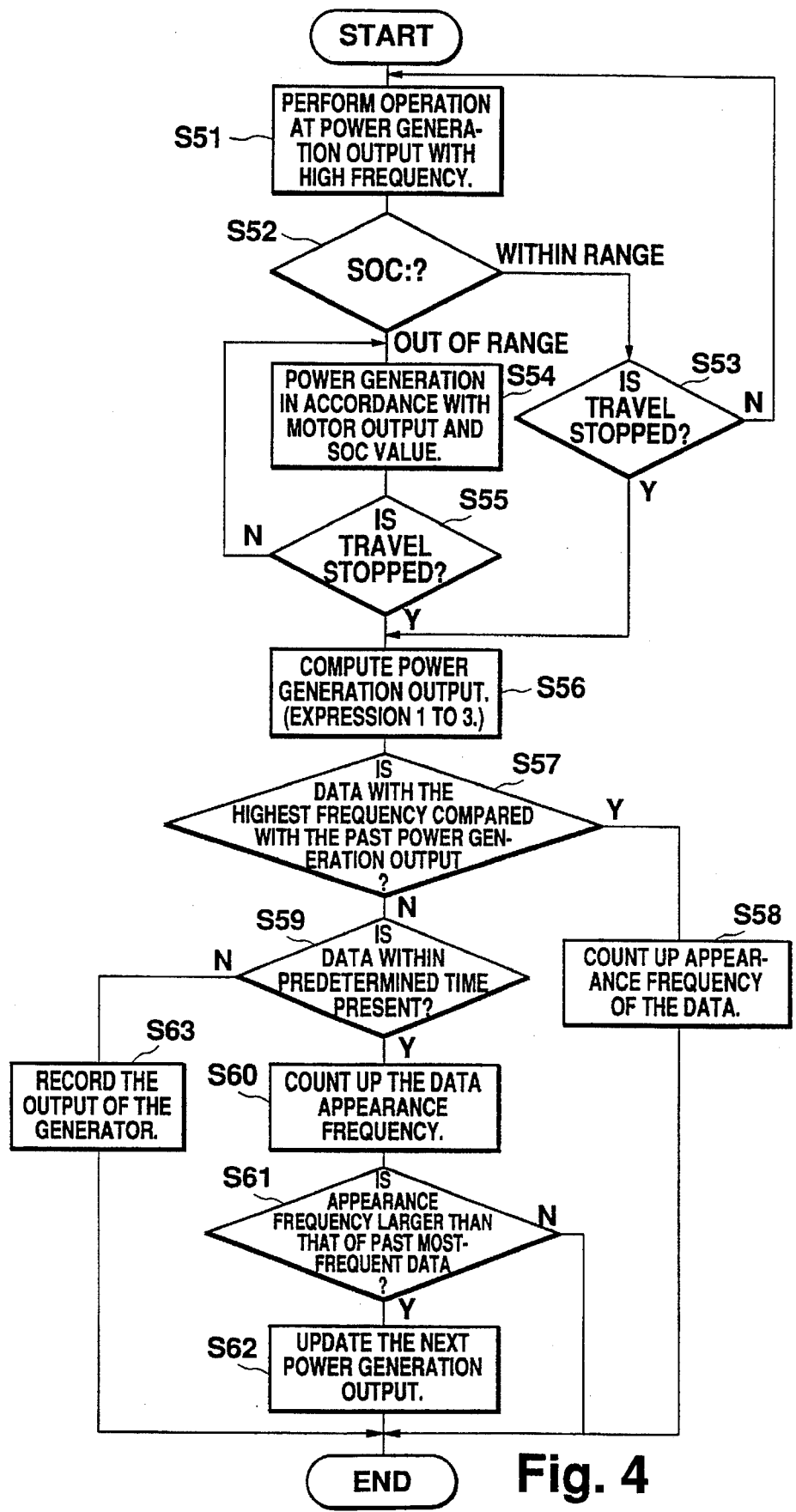
FIG. 4 is a flow chart showing operations of a third embodiment.

Operations of the third embodiment are described below by referring to FIG. 4. In the case of this embodiment, the power consumption from start to end of travel is always accumulated and the generator output corresponding to a power consumption with the highest appearance frequency among the power consumptions up to the last time is assumed as a generator output for future travel.

When travel is started, a generator output with the highest using frequency is selected out of the generator outputs, each of which is calculated for each travel stored up to the last travel and thereby the generator 20 is operated (S51). It is also possible to store the power consumption for each travel instead of the generator output. Moreover, it is preferable to calculate the usage frequency by sectioning power consumption every 1 kW and counting a power consumption included in each section. That is, the frequency is obtained by dividing the accumulated power consumption for one-time travel by time to obtain the average power consumption and counting the average power consumption every predetermined section. Then, an electrical energy corresponding to average power consumption with the highest usage frequency is assumed as a target generator output.

Then, it is decided whether SOC is kept in a predetermined range (S52). For example, it is decided whether SOC is kept between 70 and 90% (both excluded). When SOC is included in the above range, the generator output corresponds to the power consumption under travel. Therefore, it is decided whether to stop travel (S53) and S51 is restarted. However, unless SOC is included in the above range, it is decided that the generator output is not proper. Therefore, the output of the generator 20 is set to a power generation value corresponding to motor output or SOC (S54). Thereby, it is possible to maintain the SOC and continue the travel. Then, it is decided whether to stop the travel (S55). Unless the travel is stopped, S54 is restarted to continue the travel.

However, if the travel is stopped in S53 and S55, the power consumption for the travel this time is calculated in accordance with the above expressions (1) to (3) and a target generator output is computed (S56) because the travel is terminated. Then, it is decided whether the calculated target generator output is the data for a generator output with the highest frequency (S57). When the calculated target generator output has a data value with the highest usage frequency among stored data values (or the output is included in the range of stored data values), the number of times of appearance of the data value is counted up (S58) and the processing is terminated.

However, unless the target generator output calculated this time has a data value with the highest usage frequency among stored data values in S57, it is decided whether the target generator output is kept in a predetermined range of any one of stored target generator outputs (S59). When the target generator output is kept in the predetermined range, the number of times of appearance of the data value is counted up (S60).

Then, the counted-up result in S60 is compared with the appearance frequency of the most-frequent data value (S61). When the frequency data calculated this time is maximum, the data for the target generator output this time is updated to the next-time generator output (S62) and the processing is terminated. Unless the frequency data is maximum in S61, the processing is immediately terminated. Moreover, unless a target generator output included in the predetermined range is found in S59, the calculated target generator output is directly stored (S63) and the processing is terminated Thus, according to this embodiment, the power generation of the generator 20 is automatically set to a target generator output appearing at a high frequency. Therefore, power generation is set to a correct value at a high probability. Moreover, because the data for appearance frequency is updated each time, data becomes very accurate.

Furthermore, power generation does not correspond to actual power consumption due to a state such as SOC, it is possible to automatically change the power generation. Therefore, it is possible to prevent the situation where a vehicle cannot travel because the battery 16 is completely discharged or electrical power is excessively generated- It is preferable to set a predetermined upper limit of counted values and to subtract all predetermined values from the counted values when one of the counted values reaches the upper limit.

Figure 5:
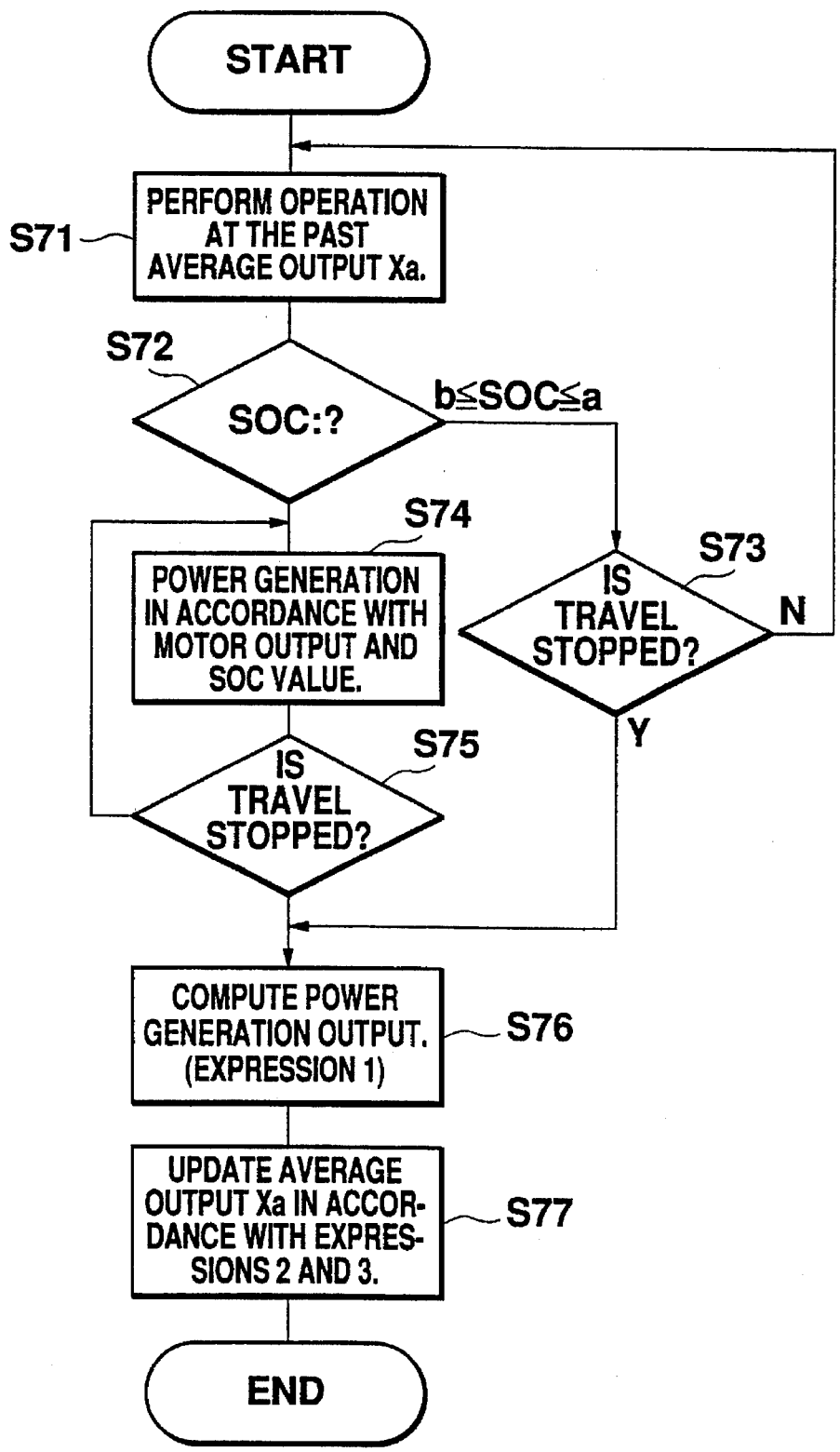
FIG. 5 is a flow chart showing operations of a fourth embodiment.

The fourth embodiment controls generator output in accordance with the average motor output during previous journeys Operations of this embodiment are described below by referring to FIG. 5.

When travel of an electric vehicle starts, the generator 20 is operated by the past average motor output or a target generator output calculated from the average power consumption (S71). Then, it is decided whether SOC is maintained in a predetermined range. When the SOC is maintained in the range, the operation of the generator is continued until the travel is stopped. If the SOC is out of the range, power generation is controlled in accordance with motor output or SOC value until the travel is stopped (S72 to S75). This procedure is the same as that in S52 to S55 in FIG. 4.

When the travel is stopped, generator outputs are computed (S76) and averaged to update the average output (S76, S77).

Therefore, according to this embodiment, the output of the generator 20 is automatically set to an average power generation. Thus, because the probability that the average power generation is a power generation corresponding to travel is high, it is possible to preferably control power generation.

Moreover, the same technique as that of the first embodiment can be used to obtain the average.

What is claimed is:

1. A generator output controller for a vehicle mounted with a generator in addition to a battery, comprising:
   travel-pattern recognition means for recognizing a travel pattern repeated in accordance with a specific pattern;
   a travel-pattern power consumption memory unit for storing data for power consumption during travel in the travel pattern; and
   travel-pattern power generation control means for controlling an output of said generator during travel in the travel-pattern to generate power corresponding to the power consumption in the travel pattern read out of the travel-pattern power consumption memory unit when the travel pattern is recognized by the travel-pattern recognition means.

2. The controller according to claim 1, wherein the travel-pattern recognition means includes travel-pattern start input means for inputting a travel-pattern start and travel-pattern end input means for inputting a travel-pattern end.

3. The controller according to claim 2, further comprising travel-pattern power consumption detection means for detecting the power consumption of said vehicle during travel in the travel-pattern and update means for updating a target power generation stored in the travel-pattern power consumption memory unit in accordance with the detected power consumption of said vehicle during travel in the travel pattern.

4. The controller according to claim 3, wherein the update means averages accumulated travel pattern power consumptions including the detected travel pattern power consumption and updates said target power generation in accordance with the averaged power consumption.

5. The controller according to claim 1, wherein said controller further comprises starting time detection means for detecting a starting time of said vehicle, and wherein the travel-pattern power consumption memory unit stores the power consumption during travel in the travel pattern by relating the power consumption with the starting time of the vehicle, and the travel-pattern power generation control means controls said generator in accordance with the power consumption related with the starting time of the vehicle for the travel pattern.

6. The controller according to claim 5, further comprising an update means for updating a target power generation in accordance with the travel-pattern power consumptions.

7. The controller according to claim 5, further comprising detection means for detecting travel-pattern power consumption during travel in the travel-pattern and duration detection means for detecting a duration of travel of said vehicle, wherein said travel-pattern recognition means recognizes the travel pattern from stored data when a journey is repeated a predetermined number of times by storing the starting time, the power consumption, and the duration of travel of said vehicle when the vehicle travels.

8. The controller according to claim 6, wherein the update means updates the target power generation stored in the travel-pattern power consumption memory unit in accordance with detected power consumption of said vehicle for the recognized travel pattern.

9. The controller according to claim 8, wherein the update means averages the travel-pattern power consumptions including the detected travel pattern power consumption and updates said target power generation in accordance with the averaged power consumption.

10. The controller according to claim 6, wherein the update means averages accumulated travel pattern power consumptions including a detected travel pattern power consumption and updates said target power generation in accordance with the averaged power consumption.

11. A generator output controller for an electric vehicle mounted with a generator in addition to a battery, comprising:
    power consumption detection means for detecting a power consumption of said electric vehicle during travel of the electric vehicle;
    generator output data value decision means for deciding which data value the detected power consumption is included in among predetermined data values;
    data value usage frequency detection means for counting an appearance frequency for each data value; and
    power generation control means for controlling output of said generator to a target generator output corresponding to a power consumption data value with the highest usage frequency in accordance with a detection result of the data value usage frequency detection means.

12. The controller according to claim 11, wherein said power generation control means includes state-of-charge detection means for detecting a state of charge of said battery and correction means for correcting generator output so as to one of decrease and increase an output in accordance with the detected state of charge when the detected state of charge is one of higher than a predetermined upper limit and lower than a predetermined lower limit, respectively.

13. A generator output controller of an electric vehicle mounted with a generator in addition to a battery, comprising:
    power consumption detection means for detecting a power consumption of the electric vehicle during travel of the electric vehicle;
    power consumption averaging means for averaging power consumptions of different travel patterns of the electric vehicle; and
    power generation control means for controlling generator output in accordance with the averaged power consumption calculated by the power consumption averaging means.

14. The controller according to claim 13, wherein said power generation control means includes state-of-charge detection means for detecting a state of charge of said battery and correction means for correcting generator output so as to one of decrease and increase an output when the detected state of charge is one of higher than a predetermined upper limit and lower than a predetermined lower limit, respectively.

* * * * *